US012583098B2

(12) United States Patent (10) Patent No.: US 12,583,098 B2
Franklin et al. (45) Date of Patent: Mar. 24, 2026

(54) MAGNETIC DEVICE EMPLACEMENT TOOL

(71) Applicant: Nightwing Group, LLC, Dulles, VA (US)

(72) Inventors: Cameron P. Franklin, Chesapeake, VA (US); Kirk L. Traber, Virginia Beach, VA (US)

(73) Assignee: NIGHTWING GROUP, LLC, New York, NY (US)

( * ) Notice: Subject to any disclaimer, the term of this patent is extended or adjusted under 35 U.S.C. 154(b) by 1008 days.

(21) Appl. No.: 17/660,180

(22) Filed: Apr. 21, 2022

(65) Prior Publication Data

US 2023/0339095 A1 Oct. 26, 2023

(51) Int. Cl.
| | |
|---|---|
| *B25J 1/04* | (2006.01) |
| *A47F 13/06* | (2006.01) |
| *B25J 15/00* | (2006.01) |
| *B25J 15/06* | (2006.01) |

(52) U.S. Cl.
CPC ................. B25J 1/04 (2013.01); A47F 13/06 (2013.01); B25J 15/009 (2013.01); B25J 15/0608 (2013.01)

(58) Field of Classification Search
CPC ........ B25J 1/04; B25J 15/009; B25J 15/0608; A47F 13/06; H01F 7/0252
See application file for complete search history.

(56) References Cited

U.S. PATENT DOCUMENTS

| | | | |
|---|---|---|---|
| 3,437,786 A | 4/1969 | Colinet et al. | |
| 3,682,265 A | 8/1972 | Hiraoka et al. | |
| 5,647,623 A | * 7/1997 | Shiao | B25J 1/04 |
| | | | 362/120 |
| 6,402,212 B1 | * 6/2002 | Hsiao | E01H 1/14 |
| | | | 209/215 |
| 6,471,273 B1 | * 10/2002 | Friedrich | B66C 1/04 |
| | | | 294/65.5 |
| 6,592,161 B1 | * 7/2003 | Hsiao | B25H 3/02 |
| | | | 209/215 |
| 6,677,845 B1 | * 1/2004 | Fader | H01F 7/0257 |
| | | | 294/65.5 |

(Continued)

OTHER PUBLICATIONS

Trackimo, "Trackimo Waterproof Magnetic Box & 6 Month Battery Extender for car Vehicle Truck, spy Surveillance, shipments, Asset Tracking for Tracki GPS Tracking Devices," Amazon.com, Jan. 2019, 10 pages.

(Continued)

*Primary Examiner* — Stephen A Vu

(74) *Attorney, Agent, or Firm* — Cowan, Liebowitz & Latman, P.C.; Mark Montague

(57) ABSTRACT

A system includes a magnetic device and an emplacement tool. The emplacement tool includes at least one magnetic rotating member rotatable about a first axis and configured to adhere to a ferrous surface. The emplacement tool also includes a friction fit head configured to hold the magnetic device between internal surfaces of the friction fit head on opposing sides. The emplacement tool further includes a coupler connected to the at least one magnetic rotating member. The coupler is configured to attach to the friction fit head such that the friction fit head extends along a second axis different than the first axis.

17 Claims, 9 Drawing Sheets

(56) References Cited

U.S. PATENT DOCUMENTS

| | | | |
|---|---|---|---|
| 7,049,919 B2 * | 5/2006 | Yamaki | H01F 7/0294 |
| | | | 269/8 |
| 7,099,746 B2 | 8/2006 | Ross et al. | |
| 8,104,620 B2 * | 1/2012 | Lin | B03C 1/08 |
| | | | 15/1 |
| 9,586,636 B1 | 3/2017 | Burmeister et al. | |
| 2010/0245120 A1 | 9/2010 | Porter et al. | |
| 2014/0230711 A1 | 8/2014 | Lovelace et al. | |
| 2021/0047016 A1 | 2/2021 | Rygg et al. | |

OTHER PUBLICATIONS

Cybernetix, "Magnetic Hull Crawler (MHC)," Product sheet, Jul. 2021, 2 pages.

Elastec Products, "Magnetic Hull Connector," Aug. 2020, 4 pages.

"Long Baseline Acoustic Positioning System," Wiki.GIS.com—The GIS Encyclopedia, Nov. 2011, 14 pages.

* cited by examiner

100

104

106

108

110

114

102

112

UP

LATERAL

LONGITUDINAL

MAGNETIC DEVICE EMPLACEMENT TOOL

TECHNICAL FIELD

This disclosure generally relates to magnetic sensors and other magnetic devices. More specifically, this disclosure relates to a magnetic device emplacement tool.

BACKGROUND

There are various types of magnetic sensors and other magnetic devices that can be used to collect information, transmit or receive wireless signals, or perform other functions. For example, magnetic sensors, magnetic beacons, or other magnetic devices may be placed onto the hulls of naval vessels in order to perform one or more functions related to the naval vessels. When a magnetic device is designed to transmit or receive wireless signals, the magnetic device typically includes one or more antennas for transmitting or receiving the wireless signals. The one or more antennas typically operate more effectively when positioned above the waterline on the hull of a naval vessel.

The waterline of a naval vessel refers to the location where the hull of the vessel meets the surface of a body of water. A vessel is referred to as being in a "laden" state when the vessel holds cargo and in an "unladen" state when the vessel does not hold cargo. Cargo is very heavy, and the bottom of the hull of a naval vessel is positioned deeper below the surface of the body of water when the vessel is carrying a full load of cargo onboard the vessel compared to when the vessel is empty. The hull of a naval vessel is often painted or otherwise marked with a laden waterline marker, which is a line parallel to the surface of a body of water when a full load of cargo is aboard the vessel. In some instances, there is approximately 10 meters (approximately 32.8 feet) of vertical distance between the laden waterline marker and the bottom of the hull. Also, in some instances, the hull of a naval vessel is painted with both an unladen waterline maker and a laden waterline marker, and there can be a vertical separation of several feet between the two waterline markers.

SUMMARY

This disclosure provides a magnetic device emplacement tool.

In a first embodiment, an apparatus includes at least one magnetic rotating member rotatable about a first axis and configured to adhere to a ferrous surface. The apparatus also includes a friction fit head configured to hold a magnetic device between internal surfaces of the friction fit head on opposing sides. The apparatus further includes a coupler connected to the at least one magnetic rotating member. The coupler is configured to attach to the friction fit head such that the friction fit head extends along a second axis different than the first axis.

In a second embodiment, a system includes a magnetic device and an emplacement tool. The emplacement tool includes at least one magnetic rotating member rotatable about a first axis and configured to adhere to a ferrous surface. The emplacement tool also includes a friction fit head configured to hold the magnetic device between internal surfaces of the friction fit head on opposing sides. The emplacement tool further includes a coupler connected to the at least one magnetic rotating member. The coupler is configured to attach to the friction fit head such that the friction fit head extends along a second axis different than the first axis.

In a third embodiment, a method includes attaching a magnetic device to a structure using an emplacement tool. The emplacement tool includes at least one magnetic rotating member rotatable about a first axis and configured to adhere to a ferrous surface of the structure. The emplacement tool also includes a friction fit head configured to hold the magnetic device between internal surfaces of the friction fit head on opposing sides. The emplacement tool further includes a coupler connected to the at least one magnetic rotating member. The coupler is configured to attach to the friction fit head such that the friction fit head extends along a second axis different than the first axis.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

Figure 1:
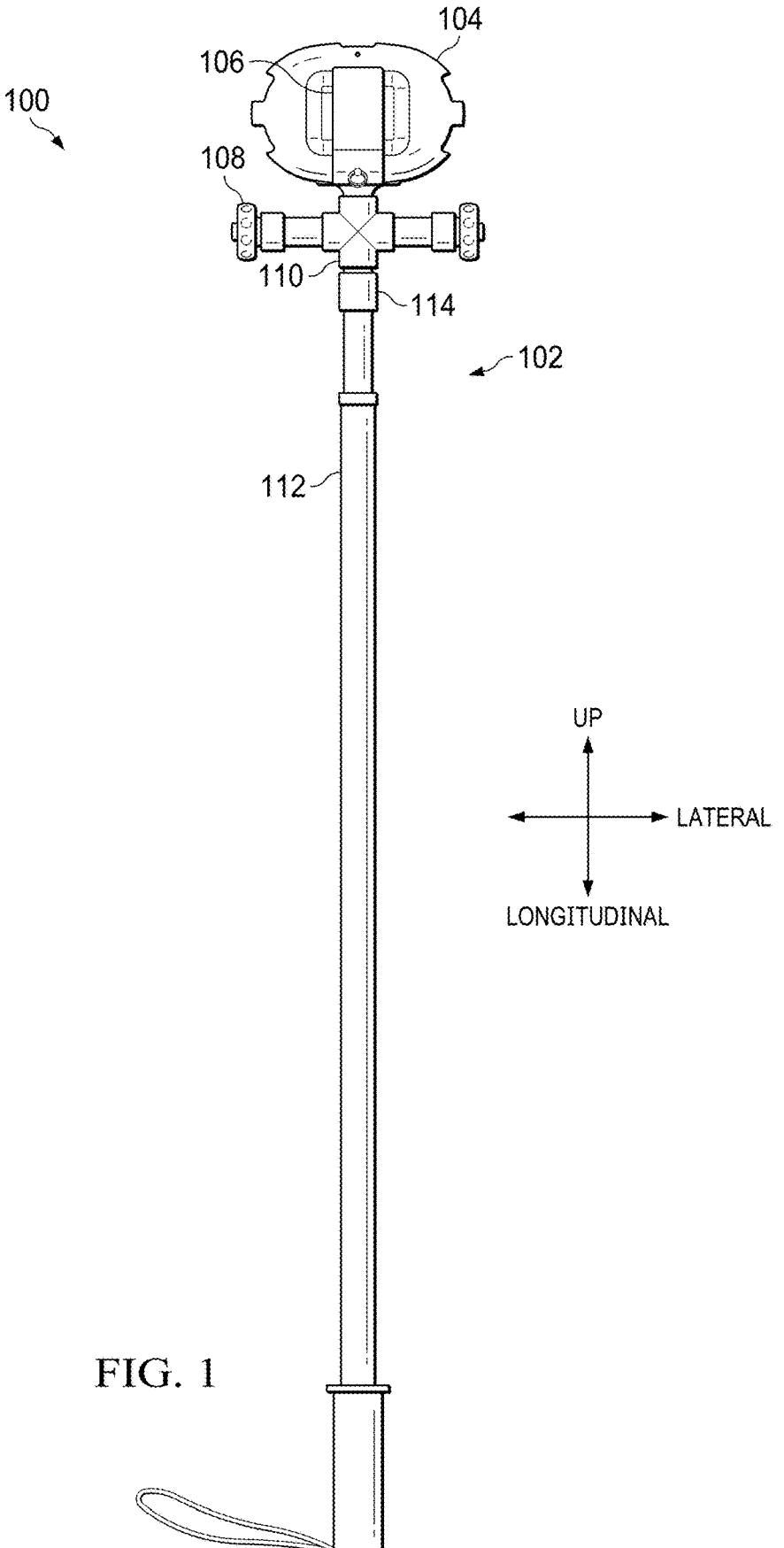
FIGS. 1 through 3 illustrate an example system including an emplacement tool and a magnetic device according to this disclosure.

FIGS. 1 through 10, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, there are various types of magnetic sensors and other magnetic devices that can be used to collect information, transmit or receive wireless signals, or perform other functions. For example, magnetic sensors, magnetic beacons, or other magnetic devices may be placed onto the hulls of naval vessels in order to perform one or more functions related to the naval vessels. When a magnetic device is designed to transmit or receive wireless signals, the magnetic device typically includes one or more antennas for transmitting or receiving the wireless signals.

The one or more antennas typically operate more effectively when positioned above the waterline on the hull of a naval vessel.

The waterline of a naval vessel refers to the location where the hull of the vessel meets the surface of a body of water. A vessel is referred to as being in a "laden" state when the vessel holds cargo and in an "unladen" state when the vessel does not hold cargo. Cargo is very heavy, and the bottom of the hull of a naval vessel is positioned deeper below the surface of the body of water when the vessel is carrying a full load of cargo onboard the vessel compared to when the vessel is empty. The hull of a naval vessel is often painted or otherwise marked with a laden waterline marker, which is a line parallel to the surface of a body of water when a full load of cargo is aboard the vessel. In some instances, there is approximately 10 meters (approximately 32.8 feet) of vertical distance between the laden waterline marker and the bottom of the hull. Also, in some instances, the hull of a naval vessel is painted with both an unladen waterline maker and a laden waterline marker, and there can be a vertical separation of several feet between the two waterline markers.

The bottom surface of a magnetic device used in certain applications often includes one or more strong magnets, such as one or more rare-earth magnets made from one or more rare-earth elements. The magnetic field, and hence the corresponding magnetic force, of these types of magnets can be significantly stronger than magnetic fields of ferrite, alnico, or soft magnets. Placing the bottom surface of the magnetic device against a ferrous structure enables the magnetic device to attach onto the ferrous structure. Since the strong magnet(s) at the bottom of the magnetic device can provide a strong magnetic force, this enables the magnetic device to stick to and remain on the structure even in extreme or harsh environmental conditions.

Unfortunately, it can be difficult to attach magnetic devices with strong magnets onto structures at desired or expected locations. This is because the strong magnet(s) of a magnetic device can be attracted to any nearby ferrous material, regardless of whether the magnetic device has been positioned at a desired or expected location. As a result, unless care is taken, it is possible for the magnetic device to become attached to the structure at an undesired location, such as below the waterline of a naval vessel.

This disclosure provides various embodiments of magnetic device emplacement tools, which can be used to attach magnetic devices onto structures such as naval vessels, bridges, or other structures. Each emplacement tool is configured to hold a magnetic device and to be lifted, lowered, or extended, such as when an emplacement tool is telescopic and can be extended a specified fixed distance or an adjustable distance. In some embodiments, in order to use the emplacement tool, a human operator can apply a lifting or lowering force in a substantially vertical direction, operate a telescopic joint of the emplacement tool, or both. During operation of a telescopic joint of an emplacement tool, the length of the emplacement tool extends or shortens longitudinally according to manipulation of the telescopic joint.

In some cases, during use, a human operator can orient the emplacement tool such that the length of the emplacement tool extends away from the human operator. In cases of a vertical-side structure (such as a naval vessel with vertical hull surfaces), the emplacement tool can be used to raise or lower the magnetic device upward or downward along a path that is substantially parallel to the direction of the human operator's lifting or lowering force or that is substantially parallel to the direction in which the emplacement tool extends. In cases of an angled-side structure (such as a naval vessel with angled hull surfaces like a flare side hull or a tumblehome side hull), the emplacement tool can be used to raise or lower the magnetic device upward or downward along a path that is non-parallel and non-perpendicular to the direction of the human operator's lifting or lowering force or the direction in which the emplacement tool extends. The emplacement tool also includes additional features that enable the emplacement tool to be used more easily or effectively, such as one or more magnetic wheels or other magnetic rotating members that can rotate against the structure.

In this way, the magnetic device emplacement tools can be used to place magnetic devices onto surfaces of naval vessels, bridge supports, or other ferrous structures. The emplacement tools can help to maintain separation of the magnetic devices from the ferrous structures until the magnetic devices are properly positioned, which can help to reduce or eliminate the chances of placing the magnetic devices onto the ferrous structures at undesired locations.

Note that the magnetic device emplacement tools may be used to place any suitable magnetic devices onto any suitable ferrous structures, where the magnetic devices may be used for any suitable purposes. For example, a magnetic device may represent a magnetic sensor that is configured to sense or measure one or more characteristics of a ferrous structure or its surrounding environment, and the magnetic sensor may include one or more memories for storing sensor measurements and/or one or more antennas for transmitting the sensor measurements. This may be useful, for instance, when monitoring the condition of a naval vessel, bridge support, or other structure in extreme or harsh environmental conditions over time. As another example, a magnetic device may represent a magnetic beacon that can transmit radio frequency (RF) signals or other signals, which may be useful to identify the magnetic device or the associated ferrous structure (such as when the magnetic device is used for vessel identification). As yet another example, a magnetic device may represent a magnetic event detector that can sense trouble conditions or other adverse events and that can transmit RF signals or other signals in response, which may be useful to support event detection. As still other examples, a magnetic device may represent a magnetic work light, a magnetic sign, or a magnetic marking that can be placed in a desired location to provide illumination, information, or notice.

As particular examples of how the magnetic device emplacement tools may be used, one or more emplacement tools may be used to install one or more magnetic work lights on ferrous bulkheads, bridge supports, building frames, or other structures in order to provide illumination in a desired area. One or more emplacement tools may be used to install tracking or marking devices on ships or cargo containers to support commercial cargo asset tracking. One or more emplacement tools may be used to install bridge or pier pylon markings, which can be useful for inspection teams or builders. One or more emplacement tools may be used to install magnetic signs to indicate overhead hazards or other hazardous conditions. One or more emplacement tools may be used to install sensors on buoys, offshore or other power generation sites (such as wind turbines), channel markers, or other maritime or other platforms (such as oil rigs and lighthouses). In general, this disclosure is not limited to any particular application or use of the magnetic devices or any particular application or use of the emplacement tools.

Figure 2:
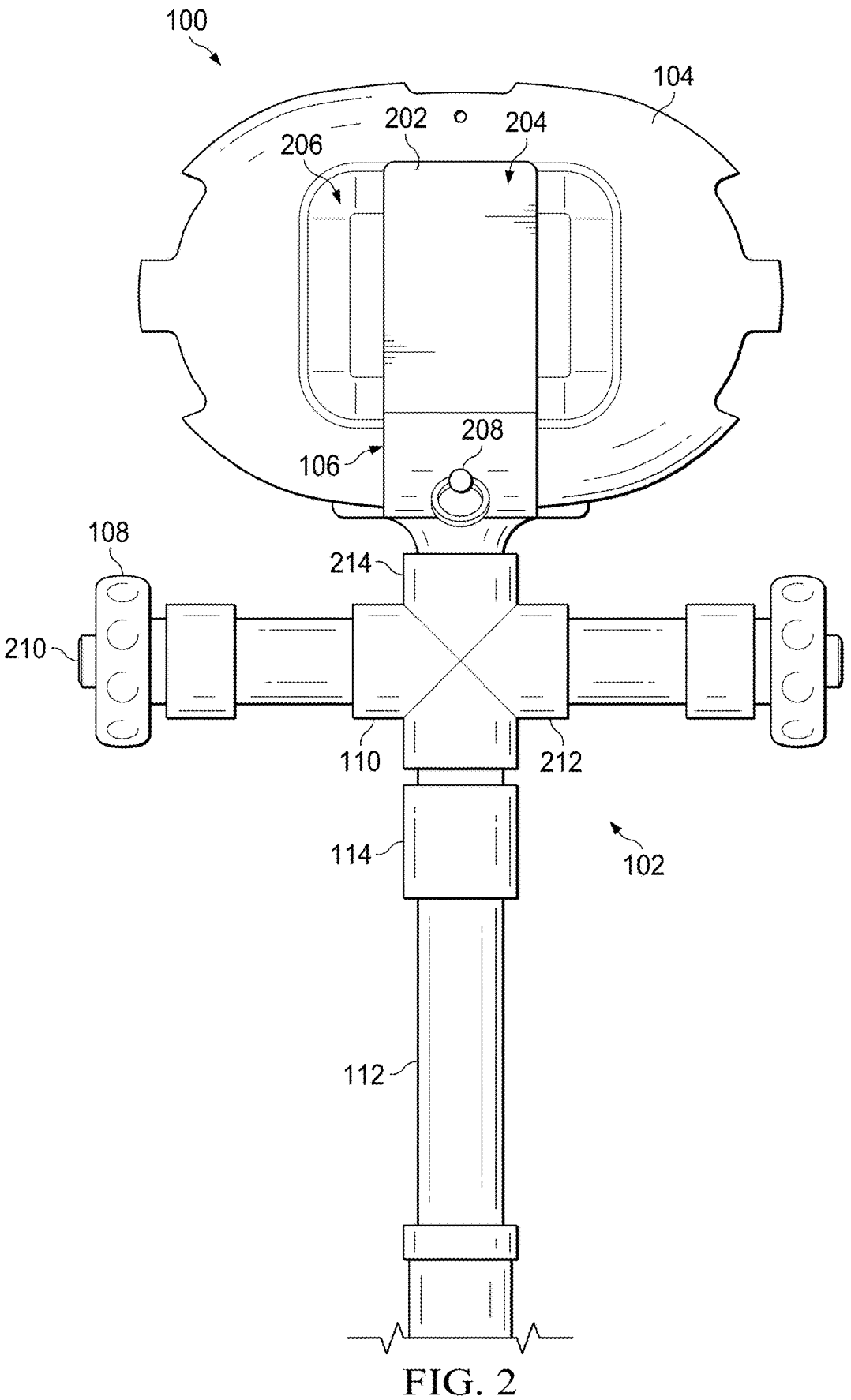
Figure 3:
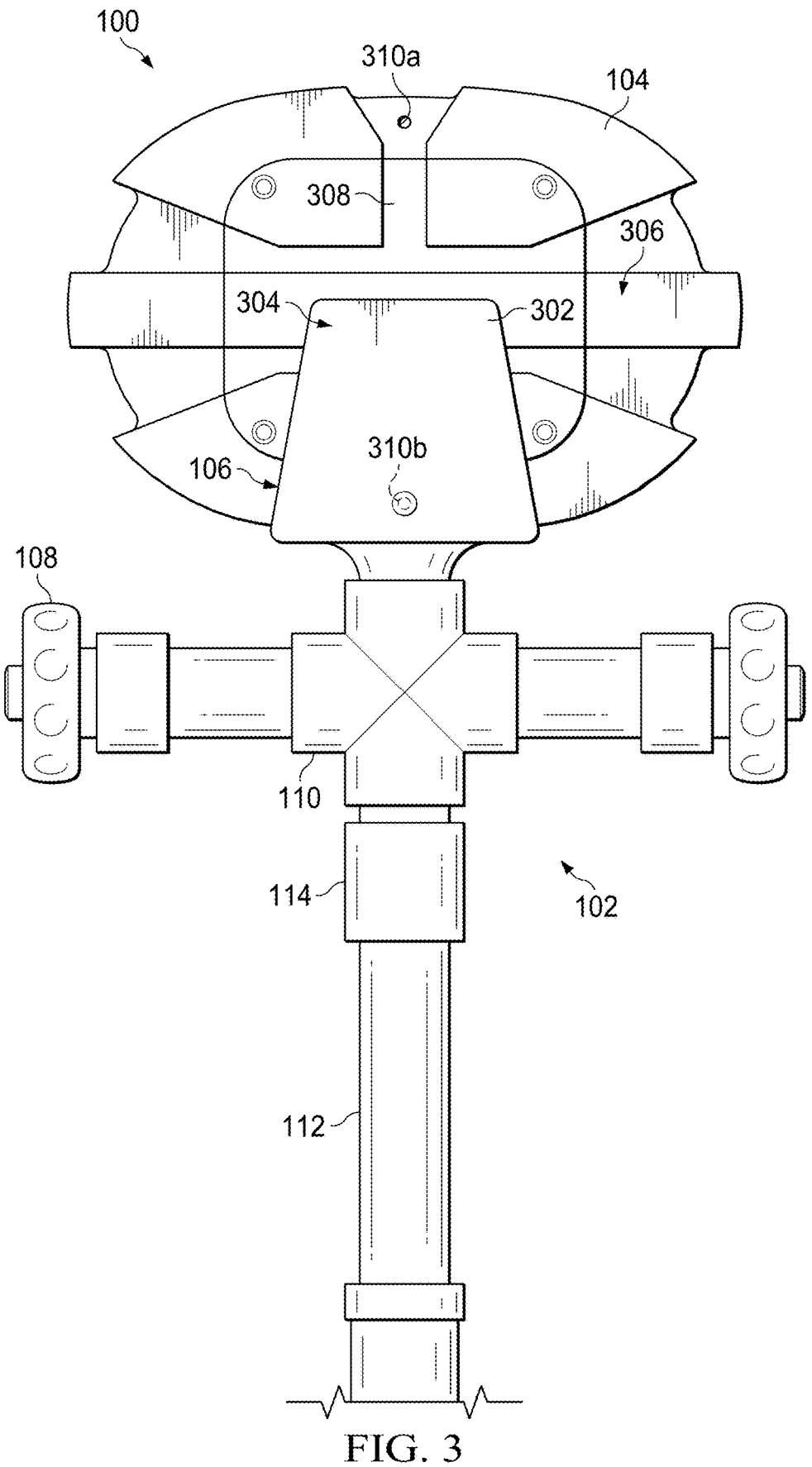

FIGS. 1 through 3 illustrate an example system 100 including an emplacement tool 102 and a magnetic device 104 according to this disclosure. As shown in FIG. 1, the emplacement tool 102 includes a friction fit head 106, at least one magnetic rotating member 108, and a coupler 110. The emplacement tool 102 also includes a lifting device 112 and an adapter 114.

The friction fit head 106 is configured to hold the magnetic device 104 between internal surfaces of the friction fit head 106 on opposing sides of the magnetic device 104. For example, internal surfaces on opposing sides of the friction fit head 106 can be used to hold a front side of the magnetic device 104 and a back side of the magnetic device 104. As shown in FIG. 2, the front side of the friction fit head 106 includes a first arm 202 configured to contact the front side of the magnetic device 104. As shown in FIG. 3, the back side of the friction fit head 106 includes a second arm 302 configured to contact the back side of the magnetic device 104. The external surfaces of the magnetic device 104 move over or otherwise contact internal surfaces of the first and second arms 202 and 302, which are positioned on opposing sides of the friction fit head 106. This movement or contact generates resistance or friction that enables the friction fit head 106 to hold the magnetic device 104.

The at least one magnetic rotating member 108 is rotatable about a first axis and is configured to adhere to a ferrous surface. For example, the at least one magnetic rotating member 108 may include one or more rollers or wheels that can rotate while being pushed along a ferrous surface. In the embodiment shown in FIGS. 1 through 3, a pair of magnetized rotating members 108*a*-108*b* are used to form the at least one magnetic rotating member 108. In some embodiments, the at least one magnetic rotating member 108 can be magnetized using training magnets.

The coupler 110 attaches the at least one magnetic rotating member 108 to the friction fit head 106. For example, the coupler 110 may be configured to attach to the friction fit head 106 such that the friction fit head 106 extends along an axis that is orthogonal or substantially orthogonal to the axis of rotation of the at least one magnetic rotating member 108. Note, however, that other orientations of the friction fit head 106 and the axis of rotation of the at least one magnetic rotating member 108 may be used. The coupler 110 is also configured to be attached to the lifting device 112. For instance, the coupler 110 may be configured to attach to the lifting device 112 such that the lifting device 112 extends along an axis that is orthogonal or substantially orthogonal to the axis of rotation of the at least one magnetic rotating member 108. Note, however, that other orientations of the lifting device 112 and the axis of rotation of the at least one magnetic rotating member 108 may be used. In the example shown here, the coupler 110 includes a four-way cross socket pipe connector, a straight pipe inserted laterally into the left socket and having a pipe cap connected to the left end of the straight pipe, and another straight pipe inserted laterally into the right socket and having another pipe cap connected to the right end. However, any other suitable coupler 110 may be used here.

The lifting device 112 may extend from the coupler 110 in a direction that is opposite to the direction that the friction fit head 106 extends away from the coupler 110. In the example shown here, the lifting device 112 represents a telescopic pole, which means that the overall length of the lifting device 112 can be increased or decreased as needed or desired. However, in other embodiments, the lifting device 112 may be a non-telescopic pole or another type of telescopic pole. Also, the lifting device 112 may be formed from any suitable material(s), such as one or more metals like stainless steel or carbon fibers. In addition, note that while the lifting device 112 here is shown as being manually operated, the lifting device 112 may alternatively form part of a remotely operated vehicle (ROV), an unmanned underwater vehicle (UUV), or other suitable lifting device.

The adapter 114 is designed with a first side that is configured to attach to the coupler 110 and an opposing second side that is configured to attach to the lifting device 112. As shown here, in cases where a bottom portion of the coupler 110 includes a standard PVC pipe socket (such as a female-end coupling) or other type of mating structure, the top side of the adapter 114 can have a shape and dimensions of a PVC pipe or other structure that fits inside the standard PVC pipe coupler or other mating structure. Of course, the adapter 114 may have any other suitable design. For instance, the adapter 114 may be designed according to the type of lifting device 112 that will be attached to the coupler 110. As a particular example, in cases where the lifting device 112 has a top end that includes a threaded male-end of a pole, the corresponding bottom side of the adapter 114 can include a hole that is tapped with threads and that has dimensions suitable for mating with the threaded male-end of the pole.

FIG. 2 illustrates a close-up view of the front of the emplacement tool 102 and the magnetic device 104 of FIG. 1, and FIG. 3 illustrates a close-up view of the back of the emplacement tool 102 and the magnetic device 104 of FIG. 1. As shown in FIGS. 2 and 3, the front side of the friction fit head 106 includes an external surface 204 of the first arm 202 of the friction fit head 106, and the back side of the friction fit head 106 includes an external surface 304 of the second arm 302 of the friction fit head 106. In this particular example, a front surface 206 of the magnetic device 104 has the shape of a truncated square pyramid with rounded vertices, and a back surface 306 of the magnetic device 104 has a perimeter in the shape of a square with rounded vertices. The back surface 306 of the magnetic device 104 is generally flat with symmetrical recesses. Note, however, that the exact shapes and sizes of the front surface 206 and the back surface 306 of the magnetic device 104 can vary as needed or desired. In this particular example, the back surface 306 of the magnetic device 104 also includes a first recessed keyhole 308 centered about a front portion of the magnetic device 104, and the back surface 306 includes a second recessed keyhole centered about a rear portion of the magnetic device 104 (which is hidden from view underneath the second arm 302 but can be identical to the first recessed keyhole 308 and positioned at a mirror-image location).

The emplacement tool 102 may also include a detent pin 208 that can be inserted through a pinhole in the first arm 202 and into one of one or more pinholes 310*a*-310*b* in the magnetic device 104. Depending on the orientation of the magnetic device 104 within the friction fit head 106, the location(s) of the pinhole(s) in the first arm 202, and the length of the first arm 202, the detent pin 208 may be insertable into the pinhole 310*a* at or near the front of the magnetic device 104 or into the pinhole 310*b* at or near the rear of the magnetic device 104. When the friction fit head 106 is holding the magnetic device 104 and the detent pin 208 is inserted into the pinhole 310*a* or 310*b*, the detent pin 208 prevents the magnetic device 104 from slipping out of the friction fit head 106. After the detent pin 208 is removed from the pinhole 310*a* or 310*b*, the magnetic device 104 can be removed from the friction fit head 106 and placed onto a ferrous surface.

In this example, the rotating members 108a-108b are attached to opposite ends of an axle 210, which is positioned within a lateral cross-member 212 of the coupler 110. The axle 210 provides a lateral axis about which each of the rotating members 108a-108b rotates. The coupler 110 also includes a longitudinal cross-member 214. The friction fit head 106 attaches to the coupler 110 at a top portion of the longitudinal cross-member 214, and the lifting device 112 attaches to the coupler 110 at a bottom portion of the longitudinal cross-member 214.

In some embodiments, the magnetic device 104 includes multiple pinholes 310a-310b. In this particular example, a first pinhole 310a is formed through a front portion of the magnetic device 104, such as through a triangular portion of the first recessed keyhole 308. A second pinhole 310b (hidden from view but illustrated by a dashed line) is formed through a rear portion of the magnetic device 104, such as through a triangular portion of the recessed keyhole 308. Note, however, that the magnetic device 104 may include any suitable number of keyholes configured to receive a detent pin.

The emplacement tool 102 can provide various benefits or advantages over prior approaches depending on the implementation. For example, the emplacement tool 102 can be used to move a magnetic device 104 to a desired position on a ferrous structure with little or no concern that the magnetic device 104 will attach to the ferrous structure at an undesired location. Also, the emplacement tool 102 can be used to securely retain the magnetic device 104 within the friction fit head 106 until placement of the magnetic device 104 is desired. Further, in some embodiments, the emplacement tool 102 is portable and is fully usable by a single human operator. In addition, in some embodiments, the emplacement tool 102 is modular and includes exchangeable components that can be used according to different types of surfaces (such as vertical-side surfaces or angled-side surfaces).

Although FIGS. 1 through 3 illustrate one example of a system 100 including an emplacement tool 102 and a magnetic device 104, various changes may be made to FIGS. 1 through 3. For example, various components in FIGS. 1 through 3 may be combined, further subdivided, replicated, omitted, or rearranged and additional components may be added according to particular needs. Also, FIGS. 1 through 3 illustrate one example type of emplacement tool 102 configured for placing one example type of magnetic device 104 onto a structure. However, this functionality may be used with any other suitable emplacement tool and any other suitable magnetic device. In some embodiments, for instance, the emplacement tool 102 may be used during training to place a training magnetic device (such as one with one or more weaker magnets) onto a ferrous surface or during operational use to place an operational magnetic device (such as one with one or more stronger magnets) onto a ferrous surface. Example implementations of features of the emplacement tool 102, the magnetic device 104, and various components of the emplacement tool 102 are described in more detail below.

Figure 4:
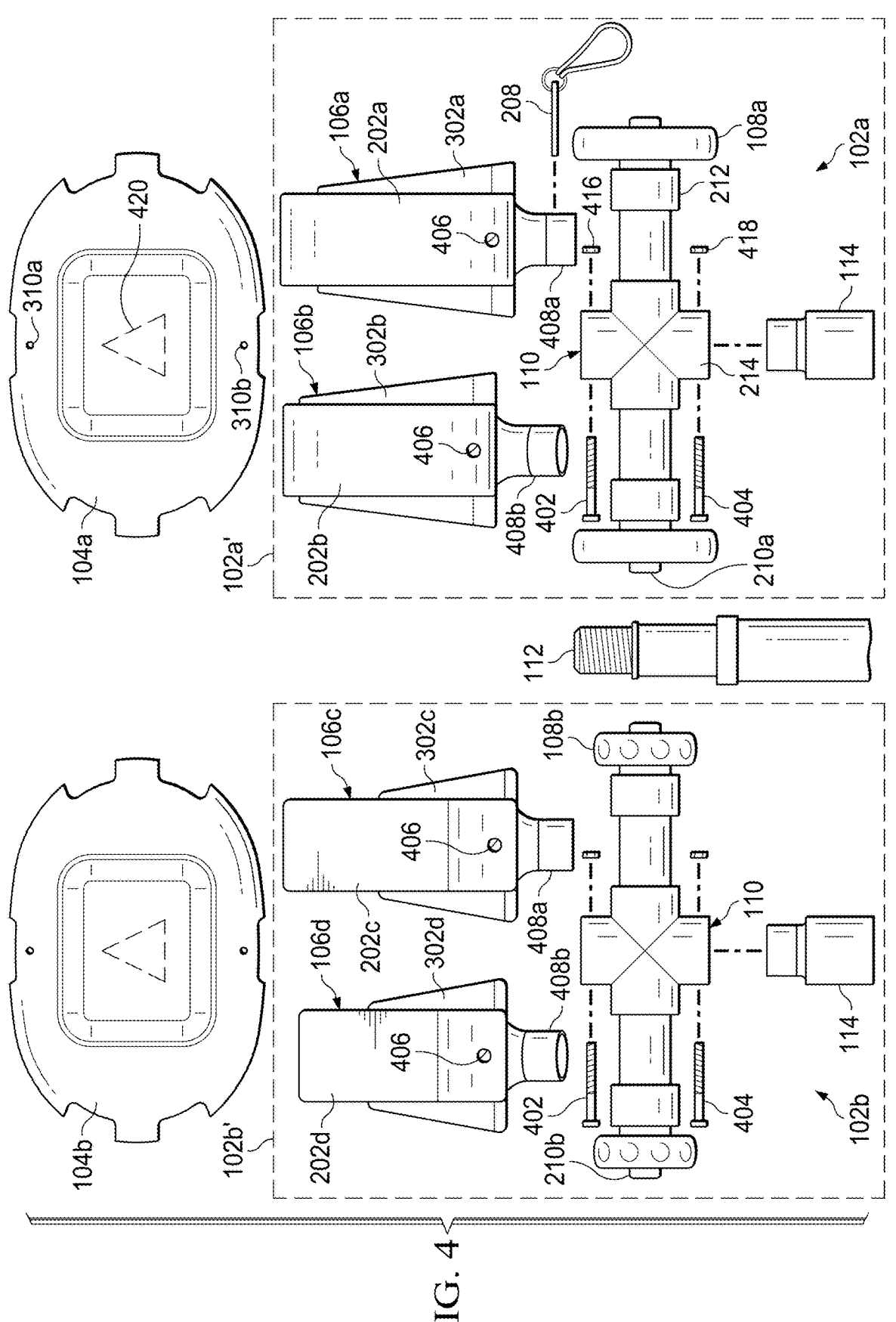
FIG. 4 illustrates an example disassembled view of first and second embodiments of the emplacement tool and the magnetic device of FIGS. 1 through 3 according to this disclosure.

FIG. 4 illustrates an example disassembled view of first and second embodiments of the emplacement tool and the magnetic device of FIGS. 1 through 3 according to this disclosure. As shown in FIG. 4, a first embodiment of an emplacement tool 102a (shown on the right in FIG. 4) is designed to hold a magnetic device 104a. For ease of explanation, the emplacement tool 102a is also referred to as an operational emplacement tool 102a, and the magnetic device 104a is also referred to as an operational magnetic device 104a. A second embodiment of an emplacement tool 102b (shown on the left in FIG. 4) is designed to hold a magnetic device 104b. For ease of explanation, the second embodiment of the emplacement tool 102b is also referred to as a training emplacement tool 102b, and the magnetic device 104b is also referred to as a training magnetic device 104b. To avoid duplicative descriptions, a detailed description of the disassembled view of the operational emplacement tool 102a is provided below, followed by a description of characteristics of the disassembled view of the training emplacement tool 102b that are different.

As shown in FIG. 4, the disassembled view of the operational emplacement tool 102a includes an operational kit 102a' having a first embodiment of a unitary friction fit head 106a, a second embodiment of a unitary friction fit head 106b, a first pair of rotating members 108a, the coupler 110, the adapter 114, a first mechanical fastener 402 (such as a bolt and nut), a second mechanical fastener 404, and the detent pin 208. In some embodiments, the operational kit 102a' includes or is usable in conjunction with the lifting device 112.

The first embodiment of the unitary friction fit head 106a represents one embodiment of the friction fit head 106. Thus, the unitary friction fit head 106a can be configured to hold the magnetic device 104a between first and second arms 202a and 302a. Here, the unitary friction fit head 106a is configured to place the magnetic device 104a on a vertical-side structure, such as a vertical-side hull. For distinction, the unitary friction fit head 106a can be referred to as a vertical-side operational friction fit head. The second arm 302a of the unitary friction fit head 106a is shaped as a wedge, which is thickest at the bottom end and thinnest at the top end in the orientation shown in FIG. 4. The second arm 302a of the unitary friction fit head 106a is a vertical-side wedge configured to slide upward, downward, or otherwise along a substantially flat surface, which in some cases can be substantially parallel to an upward or downward force in a substantially vertical direction. When the lifting device 112 is lifted upward or downward (such as by a human operator or by a robotic arm of a UUV or ROV) in a substantially vertical direction, the second arm 302a can move upward or downward along a substantially parallel path (such as a colinear path). The vertical-side wedge is designed to slide along the vertical surface of a structure in the same direction as the lifting device 112, such as in an upward or downward substantially-vertical direction.

The thickness or thickness gradient of the wedge of the second arm 302a can help to prevent premature emplacement of the magnetic device 104a onto a ferrous surface prior to removing the wedge of the second arm 302a from a position between the ferrous surface and one or more strong magnets on the bottom side of the magnetic device 104a. The thickness of the wedge of the second arm 302a can have a thickness that overcomes the magnetic force of the strong magnet(s) on the bottom of the magnetic device 104a used for in-field operations. The first arm 202a is configured to squeeze the magnetic device 104a against an internal surface of the second arm 302a. For simplicity, the first arm 202a is referred to as a vertical-side arm, and the first arm 202a includes a pinhole 406 that is configured to receive the detent pin 208.

The unitary friction fit head 106a also includes a connector 408a configured to mate with the type of connector within the top end of the longitudinal cross-member 214 of the coupler 110. As shown here, in cases where the top end of the longitudinal cross-member 214 of the coupler 110 is a standard PVC pipe socket, the connector 408a is configured to have the shape, dimensions, and surface friction of a standard PVC pipe and is configured to fit upon insertion into the socket. That is, the friction fit head 106a connects to the coupler 110 by insertion of the connector 408a into the socket connector within the top end of the longitudinal cross-member 214. Note, however, that other mechanisms may be used to attach the unitary friction fit head 106a to the coupler 110.

The first mechanical fastener 402 fastens a friction fit head (such as any of the friction fit heads described in this document) to an upper portion of the longitudinal cross-member 214. For example, the bolt of the first mechanical fastener 402 may be inserted laterally into a hole on one side of the upper portion of the longitudinal cross-member 214, pass through a hole (shown in FIG. 7) of the connector 408a, and pass out of a hole on the opposite side of the upper portion of the longitudinal cross-member 214. The nut of the first mechanical fastener 402 attaches to the bolt in order to prevent the friction fit head from rotating about a longitudinal axis. Note, however, that other mechanical fastener may be used to attach the unitary friction fit head 106a to the coupler 110, or friction may be used to keep the unitary friction fit head 106a attached to the coupler 110.

The second mechanical fastener 404 fastens the adapter 114 to a bottom portion of the longitudinal cross-member 214 of the coupler 110. By fastening the adapter 114 to the coupler 110, the second mechanical fastener 404 enables the coupler 110 (and any component attached to the coupler 110) to rotate in unison with the lifting device 112 about a longitudinal axis. For example, the bolt of the second mechanical fastener 404 can be inserted laterally into and pass through holes of the bottom portion of the longitudinal cross-member 214 and a hole through the top portion of the adapter 114. The nut of the second mechanical fastener 404 attaches to the bolt in order to prevent the lifting device 112 from rotating about a longitudinal axis independently from the coupler 110. Note, however, that other mechanical fastener may be used to attach the adapter 114 to the coupler 110, or friction may be used to keep the adapter 114 attached to the coupler 110.

The second embodiment of the unitary friction fit head 106b represents another embodiment of the friction fit head 106. Thus, the unitary friction fit head 106b can be configured to hold the magnetic device 104a between first and second arms 202b and 302b. Here, the unitary friction fit head 106b is configured to place the magnetic device 104a on an angled-side structure, such as an angled-side hull. For distinction, the unitary friction fit head 106b can be referred to as an angled-side operational friction fit head 106b. The friction fit head 106b operates in the same way and performs a similar function as the friction fit head 106a, except the friction fit head 106b functions more efficiently on an angled-side structure than on a vertical-side structure.

In the unitary friction fit head 106b, the second arm 302b is an angled-side wedge configured to slide upward or downward along a surface that is tilted (non-parallel and non-perpendicular) to an upward or downward force in a substantially vertical direction. When the lifting device 112 is lifted upward or downward in a substantially vertical direction, this can force the second arm 302b upward or downward as much as possible along the tilted surface. The angled-side wedge is designed to slide along the surface of an angled-side structure in the same direction as the lifting device 112, such as an upward or downward vertical direction at substantially the same angle as the tilt of the structure.

The thickness or thickness gradient of the wedge of the second arm 302b can help to prevent premature placement of the magnetic device 104a onto a ferrous surface prior to removing the wedge of the second arm 302b from a position between the ferrous surface and one or more magnets on the bottom side of the magnetic device 104a. The thickness of the wedge of the second arm 302b can have a thickness that overcomes the magnetic force of the strong magnet(s) on the bottom of the magnetic device 104a used for in-field operations. The first arm 202b is configured to squeeze the magnetic device 104a against an internal surface of the second arm 302b. For simplicity, the first arm 202b is referred to as an angled-side arm, and the first arm 202b includes a pinhole 406 that is configured to receive the detent pin 208.

The unitary friction fit head 106b also includes a connector 408b configured to mate with the type of connector within the top end of the longitudinal cross-member 214 of the coupler 110. The connector 408b may be similar to the connector 408a described above. However, the angle at which the connector 408b is inserted into the coupler 110 can correspond to the angle of tilt of an angled-side structure and can be different than the angle of insertion of the connector 408a into the coupler 110. Note, however, that other mechanisms may be used to attach the unitary friction fit head 106b to the coupler 110.

As shown in FIG. 4, the disassembled view of the training emplacement tool 102b includes a training kit 102b' having a third embodiment of a unitary friction fit head 106c and a fourth embodiment of a unitary friction fit head 106d, as well as a second pair of rotating members 108b. Components such as the coupler 110, the adapter 114, the first and second mechanical fasteners 402 and 404, the detent pin 208, the pinhole 406, and the lifting device 112 may be the same as or similar to corresponding components described above.

The unitary friction fit head 106c is configured to hold the training magnetic device 104b between first and second arms 202c and 302c and is configured to place the magnetic device 104b on a vertical-side structure. For distinction, the unitary friction fit head 106c can be referred to as a vertical-side training friction fit head 106c. The vertical-side training friction fit head 106c operates in the same way and performs a similar function as the vertical-side operational friction fit head 106a, except the head 106c functions more efficiently using a training magnetic device 104b than an operational magnetic device 104a.

The unitary friction fit head 106d is configured to hold the training magnetic device 104b between first and second arms 202d and 302d and is configured to place the training magnetic device 104b on an angled-side structure. For distinction, the unitary friction fit head 106d can be referred to as an angled-side training friction fit head 106d. The angled-side training friction fit head 106d operates in the same way and performs a similar function as the angled-side operational friction fit head 106b, except the head 106d functions more efficiently using a training magnetic device 104b than an operational magnetic device 104a.

In this example, the rotating members 108a are attached to opposite ends of an axle 210a, and the rotating members 108b are attached to opposite ends of an axle 210b. In some cases, the axle 210b can be identical to the axle 210a. However, in some cases, the rotating members 108b can have a smaller diameter compared to the rotating members 108a. This may be needed or desired when, for example, the arms 202c-202d, 302c-302d are thinner than the arms 202a-202b, 302a-302b. In some embodiments, the smaller size of the rotating members 108b compared to the rotating members 108a allows for fewer same-sized magnets or smaller magnets of a similar quantity to be embedded within the rotating members 108*b* compared to the rotating members 108*a*.

In some embodiments, each magnetic device 104*a*-104*b* may be used to transmit or receive wireless signals, and the magnetic device 104*a*-104*b* may include one or more antennas for transmitting or receiving the wireless signals. In some cases, the magnetic device 104*a*-104*b* may be designed so that the magnetic device 104*a*-104*b* should be installed having a specified orientation in order to obtain improved or maximum performance (compared to other orientations), such as in an orientation that allows the one or more antennas to transmit or receive wireless signals in a desired direction. As a particular example, the magnetic device 104*a*-104*b* may be configured so that the one or more antennas should be installed on a structure with a particular part of the magnetic device 104*a*-104*b* facing upward. In this example, each magnetic device 104*a*-104*b* includes an arrow or other marker 420 identifying a desired orientation of the magnetic device 104*a*-104*b*, which can be used to allow for proper orientation during installation. In some embodiments, this may help to facilitate installation with one or more antennas pointed upward for transmission towards the sky, rather than downward towards a body of water.

Each magnetic device 104*a*-104*b* here can be inserted into and fit within the associated friction fit heads 106*a*-106*b* or 106*c*-106*d*, and each magnetic device 104*a*-104*b* may include first and second pinholes 310*a* and 310*b* through which the detent pin 208 is insertable in order to prevent the magnetic device 104*a*-104*b* from sliding out of the associated friction fit head. That is, when the magnetic device 104*a*-104*b* is held by a friction fit head 106*a*-106*d*, one of the pinholes 310*a* and 310*b* can align with a pinhole 406 of the first arm 202*a*-202*d*.

In some embodiments, the training magnetic device 104*b* may not be capable of engaging in wireless communications or performing other functions of the operational magnetic device 104*a*. Instead, the training magnetic device 104*b* may be used in test scenarios and practice exercises in which a human operator trains on how to use the emplacement tool 102*b* for placing a magnetic device onto a ferrous surface. In some cases, the training magnetic device 104*b* may have dimensions, a weight distribution, and a shape identical or substantially similar to the operational magnetic device 104*a*. In particular embodiments, the training magnetic device 104*b* is physically equivalent to the operational magnetic device 104*a*. In some instances, however, one difference is that the bottom surface of the training magnetic device 104*b* may include one or more training magnets (such as one or more ferrite, alnico, or soft magnets) that are weaker or much weaker than the strong magnet(s) on the bottom of the operational magnetic device 104*a*.

Although FIG. 4 illustrates one example of a disassembled view of first and second embodiments of the emplacement tool and the magnetic device of FIGS. 1 through 3, various changes may be made to FIG. 4. For example, various components in FIG. 4 may be combined, further subdivided, replicated, omitted, or rearranged and additional components may be added according to particular needs. As a particular example, a training magnetic device 104*b* may include one or more strong magnets that are the same as or substantially similar to the strong magnet(s) of the operational magnetic device 104*a*. Also, the embodiments of the emplacement tools 102*a*, 102*b* may be used with any other suitable devices and in any other suitable systems.

Figure 5:
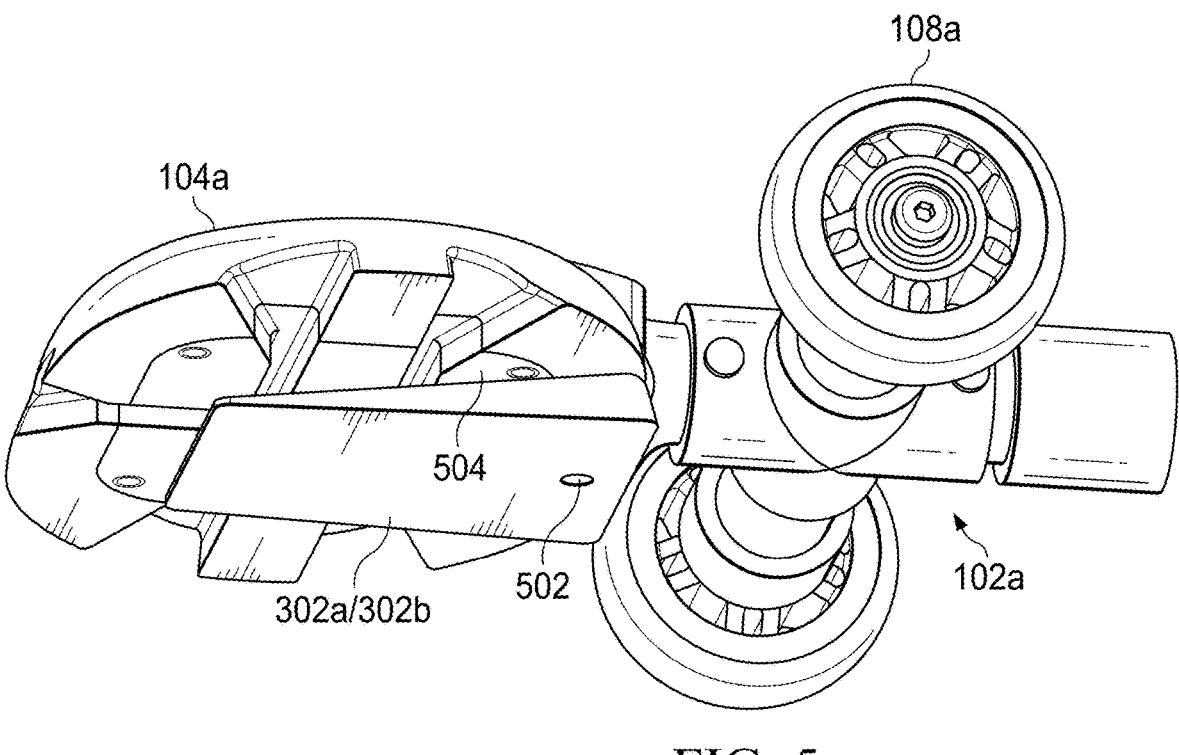
FIG. 5 illustrates an example side view of the first embodiment of the emplacement tool and the magnetic device according to this disclosure.
Figure 6:
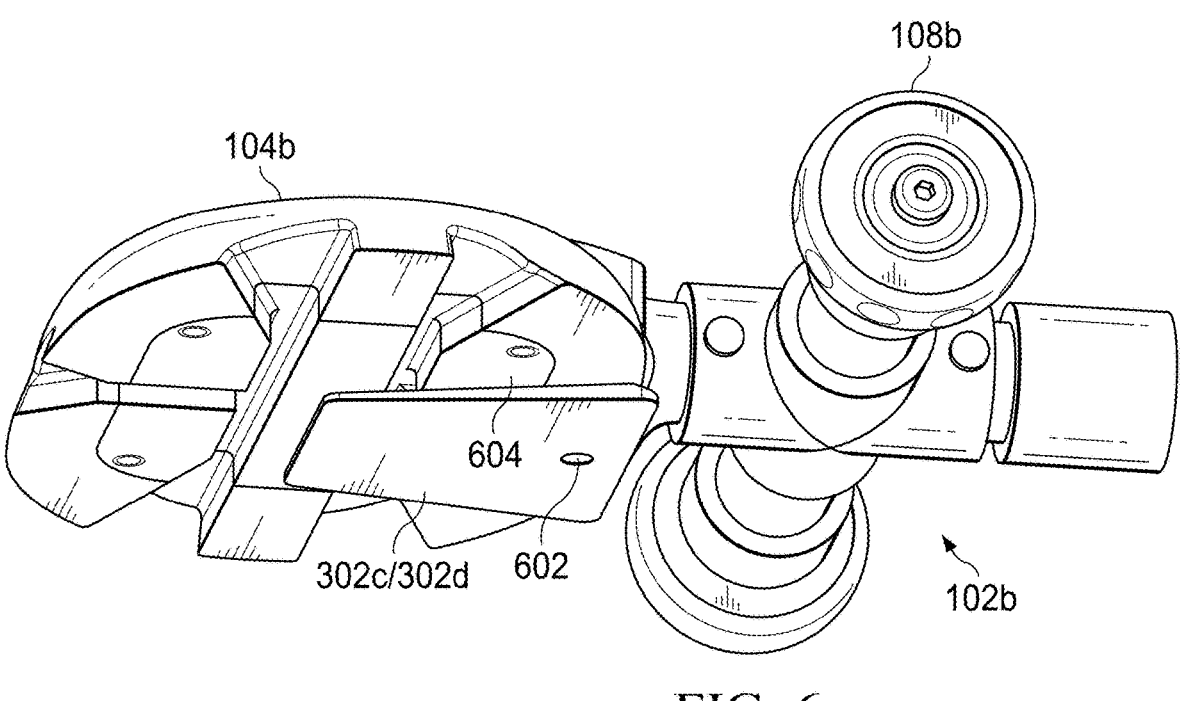
FIG. 6 illustrates an example side view of the second embodiment of the emplacement tool and the magnetic device according to this disclosure.

FIG. 5 illustrates an example side view of the first embodiment of the emplacement tool 102*a* and the magnetic device 104*a* according to this disclosure, and FIG. 6 illustrates an example side view of the second embodiment of the emplacement tool 102*b* and the magnetic device 104*b* according to this disclosure. As shown in FIG. 5, the second arm 302*a* or 302*b* of the unitary friction fit head 106*a* or 106*b* may include a pinhole 502 for the detent pin 208. Because of this, the detent pin 208 may be inserted through the pinhole 406 of the first arm 202*a* or 202*b* of the unitary friction fit head 106*a* or 106*b*, through the pinhole 310*a* or 310*b* in the magnetic device 104*a*, and through the pinhole 502. This helps to secure the magnetic device 104*a* within the unitary friction fit head 106*a* or 106*b*. Also, the bottom of the magnetic device 104*a* here includes at least one strong magnet 504, such as one or more magnets made from one or more rare-earth elements.

As shown in FIG. 6, the second arm 302*c* or 302*d* of the unitary friction fit head 106*c* or 106*d* may include a pinhole 602 for the detent pin 208. Because of this, the detent pin 208 may be inserted through the pinhole 406 of the first arm 202*c* or 202*d* of the unitary friction fit head 106*c* or 106*d*, through the pinhole 310*a* or 310*b* in the magnetic device 104*b*, and through the pinhole 602. This helps to secure the magnetic device 104*b* within the unitary friction fit head 106*c* or 106*d*. Also, the bottom of the magnetic device 104*b* here includes at least one training magnet 604. In some cases, the at least one training magnet 604 may include one or more magnets made from one or more rare-earth elements. In other cases, the at least one training magnet 604 may include one or more magnets that are weaker than the at least one strong magnet 504.

Although FIGS. 5 and 6 illustrate example side views of embodiments of the emplacement tool and the magnetic device, various changes may be made to FIGS. 5 and 6. For example, various components in FIGS. 5 and 6 may be combined, further subdivided, replicated, omitted, or rearranged and additional components may be added according to particular needs. As a particular example, the rotating members 108*a*-108*b* may be exchanged between the embodiments of the emplacement tool. Also, while the adapter 114 is not currently attached to a lifting device 112, the adapter 114 in each figure can be attached to any suitable lifting device, such as a pole or a robotic arm of a UUV or ROV.

Figure 7:
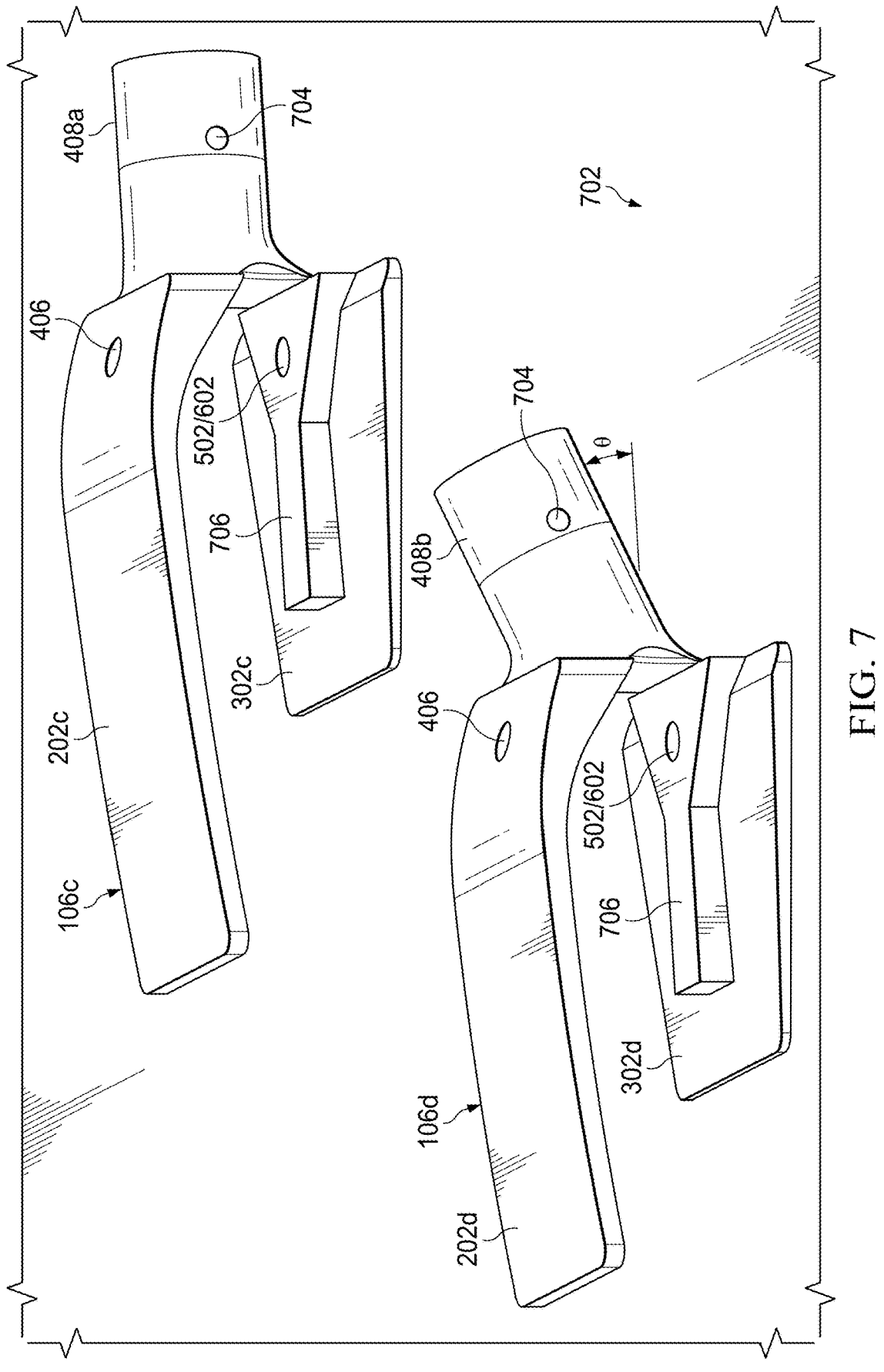
FIG. 7 illustrates example side views of embodiments of a unitary friction fit head according to this disclosure.

FIG. 7 illustrates example side views of embodiments of a unitary friction fit head 106*c*, 106*d* according to this disclosure. In this example, the friction fit heads 106*c* and 106*d* are placed flat on a table 702, which provides a horizonal plane of reference. These side views show that the angle of insertion of the connector 408*b* into the coupler 110 in angled at an angle θ relative to the angle of insertion of the connector 408*a* into the coupler 110. In some cases, the angle θ may be based on, correspond to, or match the angle of tilt of an angled-side structure. The angle of insertion of the connector 408*b* is different (more acute) than the angle of insertion of the connector 408*a* into the coupler 110. In some embodiments, the angle of insertion of the connector 408*a* of the vertical-side training friction fit head 106*c* is relatively straight, while the angle of insertion of the connector 408*b* of the angled-side training friction fit head 106*d* is not. Each connector 408*a*-408*b* also includes a hole 704 for receiving the bolt of the first mechanical fastener 402.

Each friction fit head 106*c*-106*d* may also include a protruding key 706 that protrudes from the internal surface of the second arm 302*c*-302*d*. The protruding key 706 is configured to slidably insert into a similarly-shaped recessed keyhole (similar to the keyhole 308 in FIG. 3) in the magnetic device 104a-104b. This removably attaches the friction fit head 106c-106d to the magnetic device 104a-104b and prevents lateral movement of the magnetic device 104a-104b relative to the friction fit head. In some embodiments, the protruding key 706 has a closed Y-shaped perimeter, and the pinhole 502 or 602 is positioned in the middle of the triangular portion of the closed Y-shaped protruding key 706 (although this is one example only).

Although FIG. 7 illustrates examples of side views of embodiments of a unitary friction fit head 106c, 106d, various changes may be made to FIG. 7. For example, features shown in FIG. 7 may also be used with other friction fit heads disclosed in this patent document. Also, friction fit heads of any other suitable shapes and sizes may be used with an emplacement tool.

Figure 8:
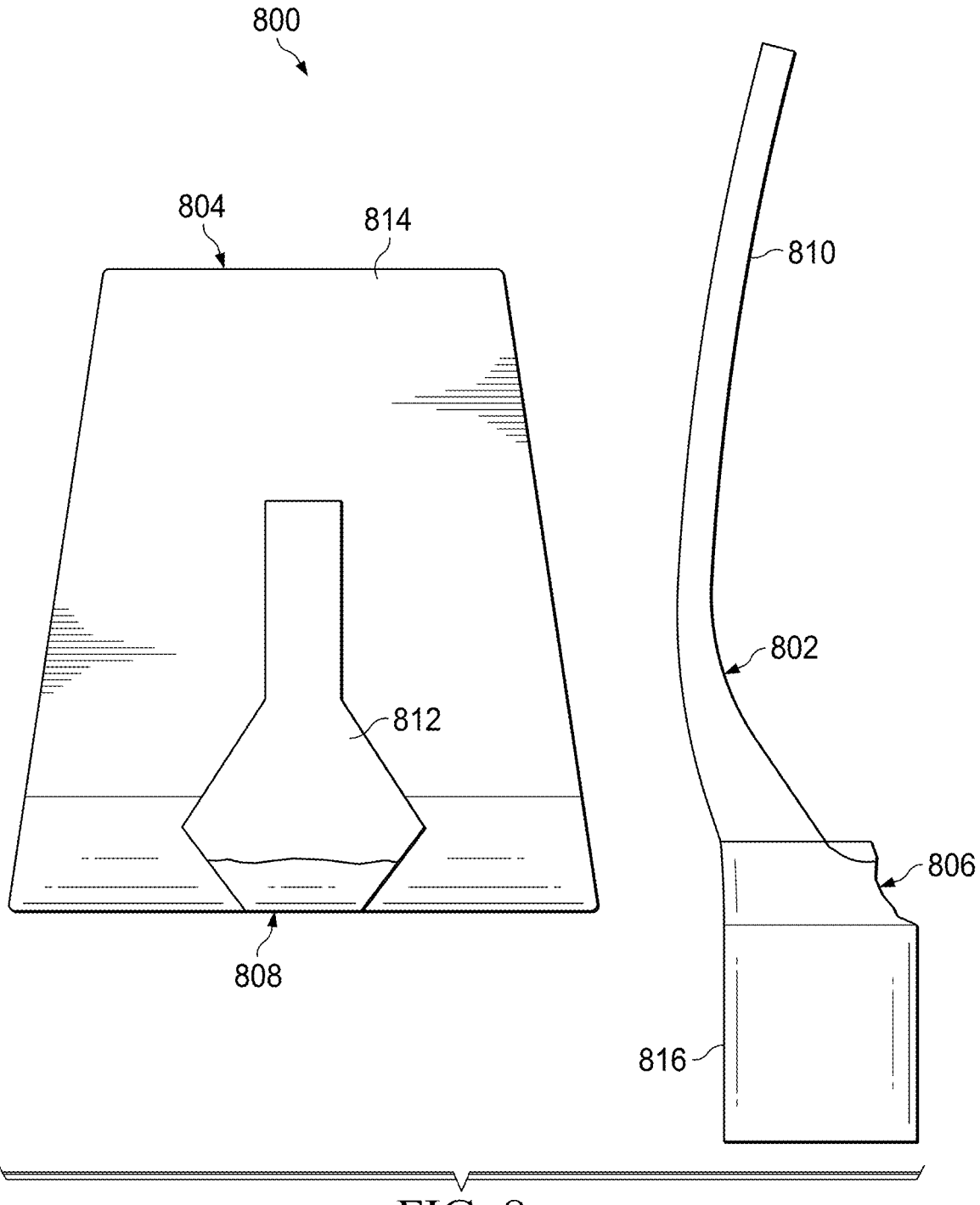
FIG. 8 illustrates an example two-piece friction fit head according to this disclosure.

FIG. 8 illustrates an example two-piece friction fit head 800 according to this disclosure. The two-piece friction fit head 800, when assembled, can have the same configuration as any of the above-described unitary friction fit heads 106a-106d. As shown in FIG. 8, the two-piece friction fit head 800 includes a first arm 802 and a second arm 804. The first arm 802 includes a first connector 806 that is configured to attach the first arm 802 to the second arm 804 by mating with a second connector 808 of the second arm 804. In some embodiments, the first connector 806 is a trapezoidal socket, and the second connector 808 is a corresponding trapezoidal protrusion (although other forms may be used). The first connector 806 is positioned on an internal-facing side 810 of the first arm 802. The second arm 804 includes a closed Y-shaped protruding key 812 on an internal surface 814, which may have the same or similar shape and the same or similar function as the key 706 of FIG. 7. The second arm 804 also includes the second connector 808, which extends longitudinally downward from the key 812 and which is configured to be inserted into the socket of the first connector 806. In addition, the first arm 802 includes an adapter 816, which may be configured to connect to the coupler 110 (in the same or similar manner as the connector 408 connects to the coupler 110).

Although FIG. 8 illustrates one example of a two-piece friction fit head 800, various changes may be made to FIG. 8. For example, multi-piece friction fit heads of any other suitable shapes and sizes may be used with an emplacement tool. As a particular example, a friction fit head can include more than two attachable pieces, such as a modular protruding key that is removably attachable to the internal surface 814 of the second arm 804 (like via a snapping or slidable connector).

Figures 9A, 9B, 9C:
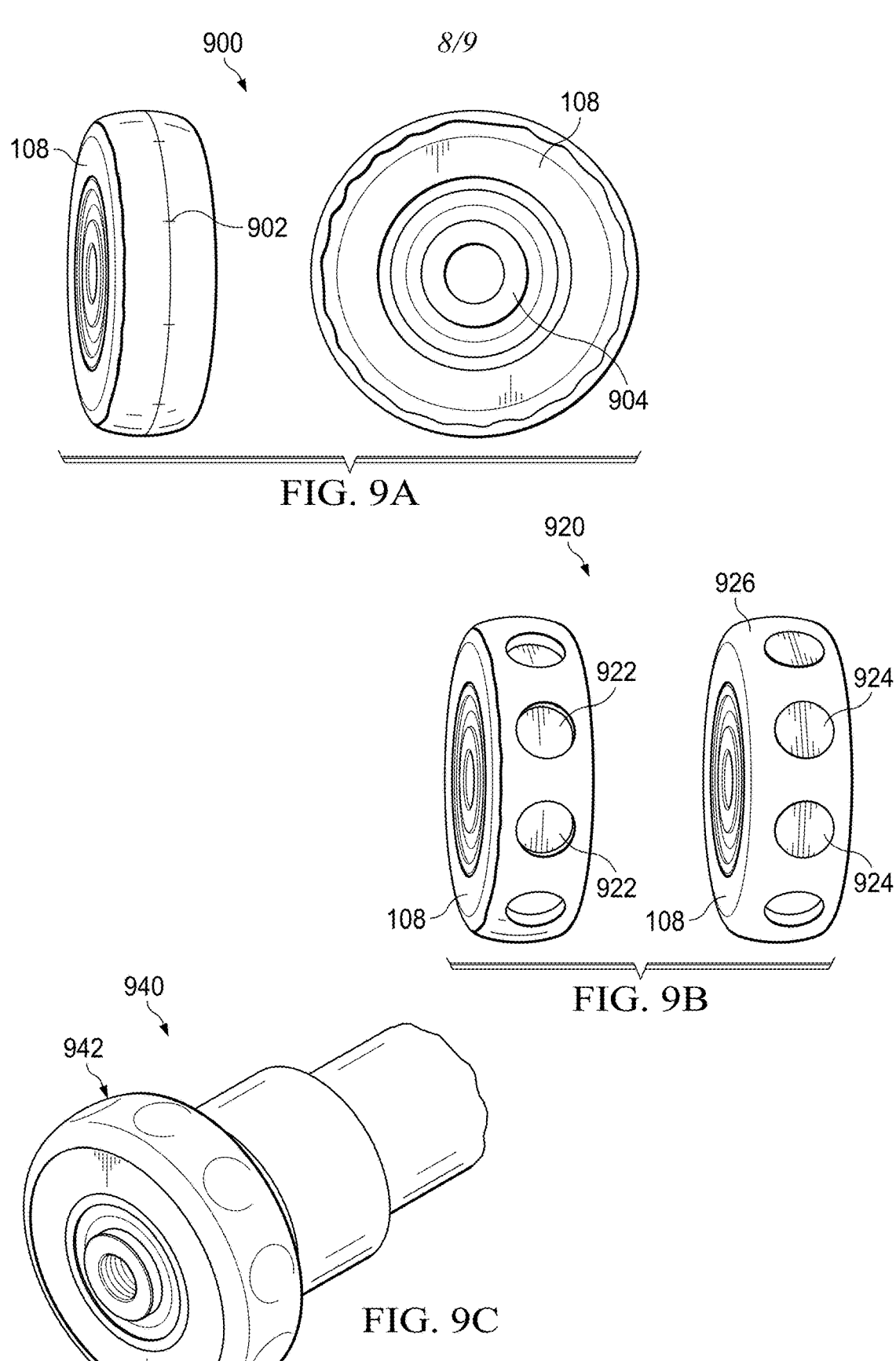
FIGS. 9A through 9C illustrate an example magnetized wheel at various stages of a fabrication process according to this disclosure.

FIGS. 9A through 9C illustrate an example magnetized wheel at various stages of a fabrication process according to this disclosure. As shown in FIG. 9A, during a stage 900, substantially equidistant markings 902 have been defined along a rolling surface of a wheel or other rotating member 108. Each marking 902 indicates a location where a shallow recess will be drilled or otherwise formed in the rotating member 108. The rolling surface of the rotating member 108 is shown on the left side in FIG. 9A, and a lateral view of a hub 904 of the rotating member 108 is shown on the right side in FIG. 9A. The hub 904 is configured to attach to an axle 210, 210a, 210b.

As shown in FIG. 9B, during a stage 920, substantially equidistant recesses 922 have been drilled into or otherwise formed in the rotating members 108. The depth of each recess 922 may be substantially the same as the height (thickness) of a magnet 924 that will be inserted into the recess 922. In some embodiments, each magnet 924 may be an operational (stronger) magnet or a training (weaker) magnet. In this example, each magnet 924 is circular having the shape of a coin, although other shapes may be used. A rolling surface 926 of each rotating member 108 may be flush with top surfaces of the magnets 924.

As shown in FIG. 9C, during a stage 940, a cover 942 may be formed over the rolling surface 926 of each rotating member 108 to cover the magnets 924 inserted into the recesses 922 of that rotating member 108. The cover 942 may be formed from any suitable material(s) applied to the rolling surface 926 of each rotating member 108 to keep the magnets 924 in place, such as a durable heat shrink.

Although FIGS. 9A through 9C illustrate one example of a magnetized wheel at various stages of a fabrication process, various changes may be made to FIGS. 9A through 9C. For example, magnetized wheels or other magnetized rotatable structures may be fabricated in any other suitable manner.

Figure 10:
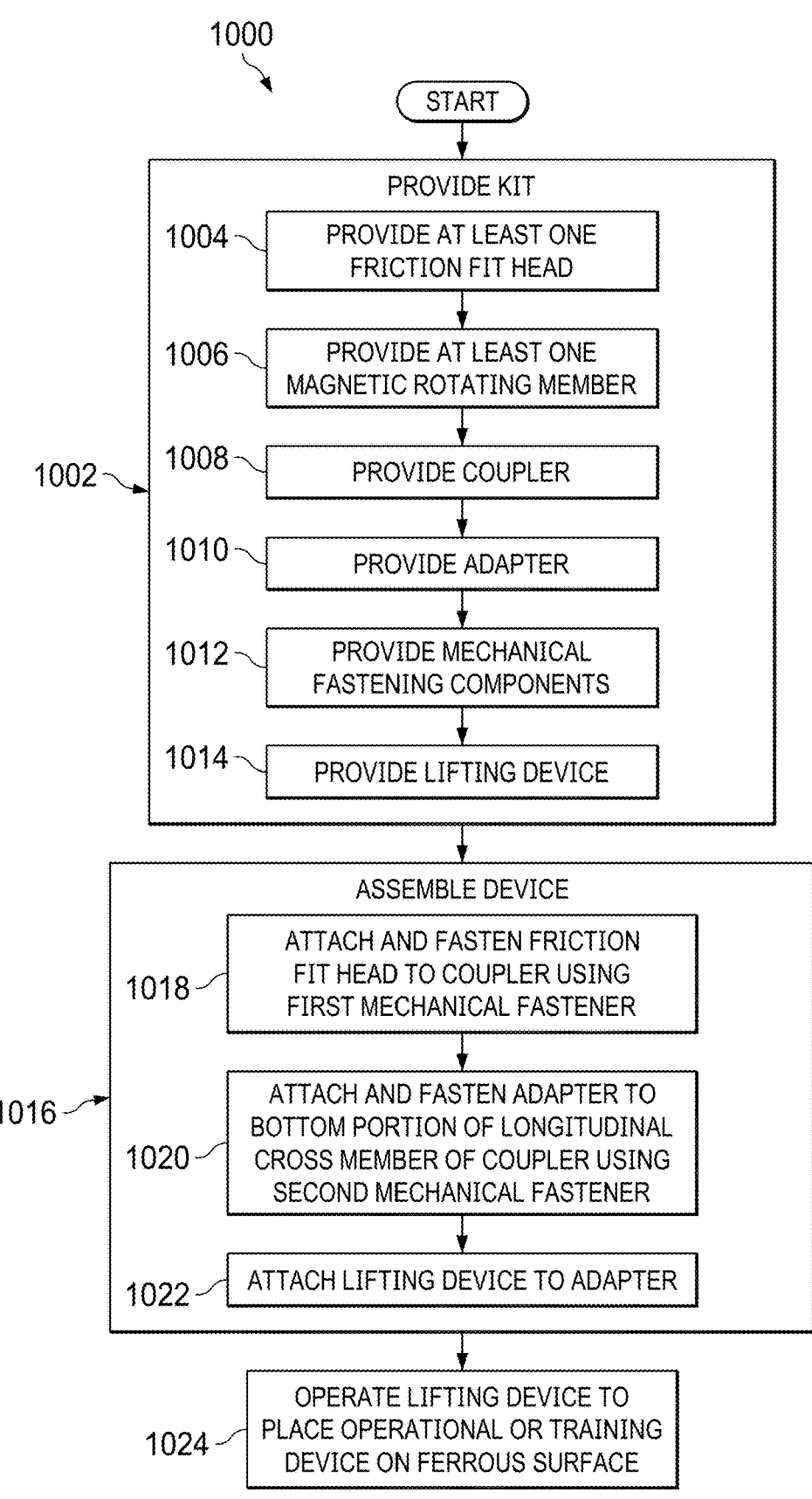
FIG. 10 illustrates an example method for using an emplacement tool according to this disclosure.

FIG. 10 illustrates an example method 1000 for using an emplacement tool according to this disclosure. For ease of explanation, the method 1000 is described as involving the use of additive manufacturing or 3D printers to fabricate an emplacement tool. However, the method 1000 may involve the use of any other suitable device in any other suitable system, including automated manufacturing.

As shown in FIG. 10, at block 1002, a kit 102a' or 102b' is provided. In some embodiments, providing the kit includes providing (at block 1004) at least one friction fit head (such as friction fit head 106a-106d), providing (at block 1006) at least one magnetic rotating member (such as a pair of rotating members 108a-108b), providing (at block 1008) a coupler 110, providing (at block 1010) an adapter 114, and providing (at block 1012) mechanical fastening components including first and second mechanical fasteners 402 and 404 and a detent pin 208. In some embodiments, providing the kit also includes providing (at block 1014) a lifting device 112. In some embodiments, providing in blocks 1004-1010 includes generating the various components of the kit 102a' or 102b', such as by using additive manufacturing or 3D printing. In other embodiments, providing in blocks 1004-1010 includes generating the various components of the kit 102a' or 102b' by obtaining standard PVC pipes and pipe connectors and cutting and molding them into suitable shapes. In still other embodiments, providing in blocks 1004-1010 includes obtaining the various components of the kit 102a' or 102b' in any other suitable manner.

At block 1016 of the method 1000, an operational emplacement tool 102a or a training emplacement tool 102b is assembled. In some embodiments, assembling the kit includes assembling the emplacement tool 102a, 102b from the provided kit 102a', 102b' by attaching and fastening (block 1018) the friction fit head 106a-106d to the coupler 110 using the first mechanical fastener 402, attaching and fastening (block 1020) the adapter 114 to a bottom portion of a longitudinal cross-member 214 of the coupler 110 using the second mechanical fastener 404, and attaching (block 1022) the lifting device 112 to the adapter 114. At block 1024, the emplacement tool 102a, 102b can be operated to place a magnetic device 104a or 404b on a ferrous surface.

Although FIG. 10 illustrates one example of a method 1000 for using an emplacement tool, various changes may be made to FIG. 10. For example, while shown as a series of steps, various steps in FIG. 10 may overlap, occur in parallel, occur in a different order, or occur any number of times. As a particular example, 3D printers or other additive manufacturing techniques or other techniques may generally operate or be used in parallel to provide (generate) various components of the emplacement tool 102a, 102b at blocks 1004-1014, and their associated steps may therefore be performed in parallel.

The following describes example embodiments of this disclosure that implement or relate to magnetic device emplacement tools. However, other embodiments may be used in accordance with the teachings of this disclosure.

In a first embodiment, an apparatus includes at least one magnetic rotating member rotatable about a first axis and configured to adhere to a ferrous surface. The apparatus also includes a friction fit head configured to hold a magnetic device between internal surfaces of the friction fit head on opposing sides. The apparatus further includes a coupler connected to the at least one magnetic rotating member. The coupler is configured to attach to the friction fit head such that the friction fit head extends along a second axis different than the first axis.

In a second embodiment, a system includes a magnetic device and an emplacement tool. The emplacement tool includes at least one magnetic rotating member rotatable about a first axis and configured to adhere to a ferrous surface. The emplacement tool also includes a friction fit head configured to hold the magnetic device between internal surfaces of the friction fit head on opposing sides. The emplacement tool further includes a coupler connected to the at least one magnetic rotating member. The coupler is configured to attach to the friction fit head such that the friction fit head extends along a second axis different than the first axis.

In a third embodiment, a method includes attaching a magnetic device to a structure using an emplacement tool. The emplacement tool includes at least one magnetic rotating member rotatable about a first axis and configured to adhere to a ferrous surface of the structure. The emplacement tool also includes a friction fit head configured to hold the magnetic device between internal surfaces of the friction fit head on opposing sides. The emplacement tool further includes a coupler connected to the at least one magnetic rotating member. The coupler is configured to attach to the friction fit head such that the friction fit head extends along a second axis different than the first axis.

Any single one or any suitable combination of the following features may be used with the first, second, or third embodiment. The friction fit head may include a first arm configured to hold a front side of the magnetic device and a second arm configured to hold a back side of the magnetic device, and the internal surfaces of the friction fit head may include an internal surface of the first arm and an internal surface of the second arm. The second arm of the friction fit head may include a vertical-side wedge configured to slide along a substantially flat surface, and the first arm may include a vertical-side arm configured to squeeze the magnetic device against an internal surface of the vertical-side wedge. The second arm of the friction fit head may include an angled-side wedge configured to slide along an angled surface, and the first arm may include an angled-side arm configured to squeeze the magnetic device against an internal surface of the angled-side wedge. The second arm of the friction fit head may have a thickness that prevents placement of the magnetic device onto the ferrous surface prior to removing the second arm from a position between the ferrous surface and one or more magnets on the back side of the magnetic device. The thickness of the second arm may have one of: (i) a first thickness that overcomes a magnetic force of one or more training or weaker magnets on the back side of the magnetic device used during training or (ii) a second thickness that overcomes a magnetic force of one or more operational or stronger magnets on the back side of the magnetic device used during operation. The friction fit head may include a two-piece friction fit head that includes (i) first arm having (a) a first adapter configured to connect to the coupler and (b) a first connector and (ii) the second arm having (a) a second connector and (b) a key, where the first connector may be configured to attach the first arm to the second arm via mating with the second connector and the key may be configured (when inserted into a keyhole of the magnetic device) to removably attach the friction fit head to the magnetic device and prevent lateral movement of the magnetic device relative to the friction fit head. The friction fit head may include a protruding key that protrudes from at least one of the internal surfaces of the friction fit head and that is configured to slidably insert into a recessed keyhole in the magnetic device, removably attach the friction fit head to the magnetic device, and prevent lateral movement of the magnetic device relative to the friction fit head. A detent pin may be insertable into a pinhole through each of a front side of the friction fit head, a back side of the friction fit head, and the magnetic device when the friction fit head is holding the magnetic device, the detent pin may be configured to prevent the magnetic device from sliding out of the friction fit head when inserted through the pinhole, and the detent pin may be configured to allow the magnetic device to be removed from the friction fit head and placed onto the ferrous surface when not inserted through the pinhole. An adapter may be configured to attach to the coupler on a first side of the adapter and to attach to a lifting device on an opposing second side of the adapter.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relation to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of
example embodiments does not define or constrain this
disclosure. Other changes, substitutions, and alterations are
also possible without departing from the spirit and scope of
this disclosure, as defined by the following claims.

What is claimed is:
1. An apparatus, comprising:
at least one magnetic rotating member rotatable about a
    first axis and configured to adhere to a ferrous surface;
a friction fit head configured to hold a magnetic device
between internal surfaces of the friction fit head on
    opposing sides; and
a coupler connected to the at least one magnetic rotating
    member, the coupler configured to attach to the friction
    fit head such that the friction fit head extends along a
second axis different than the first axis,
wherein:
the friction fit head comprises a first arm configured to
    hold a front side of the magnetic device and a second
    arm configured to hold a back side of the magnetic
device; and
the internal surfaces of the friction fit head comprise an
    internal surface of the first arm and an internal surface
    of the second arm.
2. The apparatus of claim 1, wherein:
the second arm of the friction fit head comprises a
    vertical-side wedge configured to slide along a sub-
    stantially flat surface; and
the first arm comprises a vertical-side arm configured to
    squeeze the magnetic device against an internal surface
of the vertical-side wedge.
3. The apparatus of claim 1, wherein:
the second arm of the friction fit head comprises an
    angled-side wedge configured to slide along an angled
    surface; and
the first arm comprises an angled-side arm configured to
    squeeze the magnetic device against an internal surface
    of the angled-side wedge.
4. The apparatus of claim 1, wherein:
the second arm of the friction fit head has a thickness that
prevents placement of the magnetic device onto the
    ferrous surface prior to removing the second arm from
    a position between the ferrous surface and one or more
    magnets on the back side of the magnetic device; and
the thickness of the second arm has one of:
a first thickness that overcomes a magnetic force of one
        or more training or weaker magnets on the back side
        of the magnetic device used during training; or
    a second thickness that overcomes a magnetic force of
        one or more operational or stronger magnets on the
back side of the magnetic device used during opera-
        tion.
5. The apparatus of claim 1, wherein:
the friction fit head comprises a two-piece friction fit head
    that includes:
the first arm having (i) a first adapter configured to
        connect to the coupler and (ii) a first connector; and
    the second arm having (i) a second connector and (ii)
        a key;
    the first connector is configured to attach the first arm
to the second arm via mating with the second con-
        nector; and
    the key is configured, when inserted into a keyhole of
        the magnetic device, to removably attach the friction
        fit head to the magnetic device and prevent lateral
movement of the magnetic device relative to the
        friction fit head.

6. An apparatus, comprising:
at least one magnetic rotating member rotatable about a
    first axis and configured to adhere to a ferrous surface;
a friction fit head configured to hold a magnetic device
    between internal surfaces of the friction fit head on
    opposing sides; and
a coupler connected to the at least one magnetic rotating
    member, the coupler configured to attach to the friction
    fit head such that the friction fit head extends along a
    second axis different than the first axis,
wherein the friction fit head comprises a protruding key
    that protrudes from at least one of the internal surfaces
    of the friction fit head and that is configured to:
    slidably insert into a recessed keyhole in the magnetic
        device;
    removably attach the friction fit head to the magnetic
        device; and
    prevent lateral movement of the magnetic device rela-
        tive to the friction fit head.
7. An apparatus, comprising:
at least one magnetic rotating member rotatable about a
    first axis and configured to adhere to a ferrous surface;
a friction fit head configured to hold a magnetic device
    between internal surfaces of the friction fit head on
    opposing sides;
a coupler connected to the at least one magnetic rotating
    member, the coupler configured to attach to the friction
    fit head such that the friction fit head extends along a
    second axis different than the first axis; and
a detent pin that is insertable into a pinhole through each of
a front side of the friction fit head, a back side of the friction
fit head, and the magnetic device when the friction fit head
is holding the magnetic device;
    wherein the detent pin is configured to prevent the mag-
        netic device from sliding out of the friction fit head
        when inserted through the pinhole; and
    wherein the detent pin is configured to allow the magnetic
        device to be removed from the friction fit head and
        placed onto the ferrous surface when not inserted
        through the pinhole.
8. An apparatus, comprising:
at least one magnetic rotating member rotatable about a
    first axis and configured to adhere to a ferrous surface;
a friction fit head configured to hold a magnetic device
    between internal surfaces of the friction fit head on
    opposing sides;
a coupler connected to the at least one magnetic rotating
    member, the coupler configured to attach to the friction
    fit head such that the friction fit head extends along a
    second axis different than the first axis; and
an adapter configured to attach to the coupler on a first
    side of the adapter and to attach to a lifting device on
    an opposing second side of the adapter.
9. The apparatus of claim 8, wherein the lifting device
comprises at least one of a non-telescoping pole, a telescop-
ing pole, a remotely operated vehicle, and an unmanned
underwater vehicle.
10. A system comprising:
a magnetic device; and
an emplacement tool comprising:
    at least one magnetic rotating member rotatable about
        a first axis and configured to adhere to a ferrous
        surface;
    a friction fit head configured to hold the magnetic
        device between internal surfaces of the friction fit
        head on opposing sides; and a coupler connected to the at least one magnetic rotating member, the coupler configured to attach to the friction fit head such that the friction fit head extends along a second axis different than the first axis, wherein the friction fit head comprises a first arm configured to hold a front side of the magnetic device and a second arm configured to hold a back side of the magnetic device; and the internal surfaces of the friction fit head comprise an internal surface of the first arm and an internal surface of the second arm.

11. The system of claim 10, wherein:

the second arm of the friction fit head comprises a vertical-side wedge configured to slide along a substantially flat surface; and the first arm comprises a vertical-side arm configured to squeeze the magnetic device against an internal surface of the vertical-side wedge.

12. The system of claim 10, wherein:

the second arm of the friction fit head comprises an angled-side wedge configured to slide along an angled surface; and the first arm comprises an angled-side arm configured to squeeze the magnetic device against an internal surface of the angled-side wedge.

13. The system of claim 10, wherein:

the second arm of the friction fit head has a thickness that prevents placement of the magnetic device onto the ferrous surface prior to removing the second arm from a position between the ferrous surface and one or more magnets on the back side of the magnetic device; and the thickness of the second arm has one of:

a first thickness that overcomes a magnetic force of one or more training or weaker magnets on the back side of the magnetic device used during training; or a second thickness that overcomes a magnetic force of one or more operational or stronger magnets on the back side of the magnetic device used during operation.

14. The system of claim 10, wherein:

the friction fit head comprises a two-piece friction fit head that includes:

the first arm having (i) a first adapter configured to connect to the coupler and (ii) a first connector; and the second arm having (i) a second connector and (ii) a key;

the first connector is configured to attach the first arm to the second arm via mating with the second connector; and the key is configured, when inserted into a keyhole of the magnetic device, to removably attach the friction fit head to the magnetic device and prevent lateral movement of the magnetic device relative to the friction fit head.

15. A system comprising:

a magnetic device; and an emplacement tool comprising:

at least one magnetic rotating member rotatable about a first axis and configured to adhere to a ferrous surface;

a friction fit head configured to hold the magnetic device between internal surfaces of the friction fit head on opposing sides; and a coupler connected to the at least one magnetic rotating member, the coupler configured to attach to the friction fit head such that the friction fit head extends along a second axis different than the first axis, wherein the friction fit head comprises a protruding key that protrudes from at least one of the internal surfaces of the friction fit head and that is configured to:

slidably insert into a recessed keyhole in the magnetic device;

removably attach the friction fit head to the magnetic device; and prevent lateral movement of the magnetic device relative to the friction fit head.

16. A system comprising:

a magnetic device; and an emplacement tool comprising:

at least one magnetic rotating member rotatable about a first axis and configured to adhere to a ferrous surface;

a friction fit head configured to hold the magnetic device between internal surfaces of the friction fit head on opposing sides; and a coupler connected to the at least one magnetic rotating member, the coupler configured to attach to the friction fit head such that the friction fit head extends along a second axis different than the first axis, wherein the emplacement tool further comprises a detent pin that is insertable into a pinhole through each of a front side of the friction fit head, a back side of the friction fit head, and the magnetic device when the friction fit head is holding the magnetic device;

the detent pin is configured to prevent the magnetic device from sliding out of the friction fit head when inserted through the pinhole; and the detent pin is configured to allow the magnetic device to be removed from the friction fit head and placed onto the ferrous surface when not inserted through the pinhole.

17. A system comprising:

a magnetic device; and an emplacement tool comprising:

at least one magnetic rotating member rotatable about a first axis and configured to adhere to a ferrous surface;

a friction fit head configured to hold the magnetic device between internal surfaces of the friction fit head on opposing sides; and a coupler connected to the at least one magnetic rotating member, the coupler configured to attach to the friction fit head such that the friction fit head extends along a second axis different than the first axis, wherein the emplacement tool further comprises an adapter configured to attach to the coupler on a first side of the adapter and to attach to a lifting device on an opposing second side of the adapter.

* * * * *